(12) United States Patent
Teramoto

(10) Patent No.: US 8,149,884 B2
(45) Date of Patent: Apr. 3, 2012

(54) JITTER BUFFER CONTROL METHOD AND COMMUNICATION APPARATUS

(75) Inventor: Shuji Teramoto, Tokyo (JP)

(73) Assignee: NEC Corporation, Tokyo (JP)

( * ) Notice: Subject to any disclaimer, the term of this patent is extended or adjusted under 35 U.S.C. 154(b) by 164 days.

(21) Appl. No.: 12/509,625

(22) Filed: Jul. 27, 2009

(65) Prior Publication Data
US 2010/0027567 A1 Feb. 4, 2010

(30) Foreign Application Priority Data

Jul. 30, 2008 (JP) ................................. 2008-196672

(51) Int. Cl.
*H04J 3/06* (2006.01)
(52) U.S. Cl. ........................................ 370/516; 370/252
(58) Field of Classification Search .................. 370/252, 370/412, 389, 392, 503, 509, 516
See application file for complete search history.

(56) References Cited

U.S. PATENT DOCUMENTS

| 6,327,274 | B1* | 12/2001 | Ravikanth | 370/516 |
|---|---|---|---|---|
| 6,360,271 | B1* | 3/2002 | Schuster et al. | 709/231 |
| 6,512,761 | B1* | 1/2003 | Schuster et al. | 370/352 |
| 6,865,187 | B1* | 3/2005 | Ghosh et al. | 370/431 |
| 7,191,355 | B1 | 3/2007 | Ouellette et al. | |
| 7,499,472 | B2* | 3/2009 | Spitzer | 370/505 |
| 7,526,000 | B2* | 4/2009 | Van Gestel | 370/516 |
| 7,801,953 | B1* | 9/2010 | Denman et al. | 709/204 |
| 2003/0202528 | A1 | 10/2003 | Eckberg | |
| 2006/0192656 | A1* | 8/2006 | Castle et al. | 340/10.34 |
| 2007/0237216 | A1* | 10/2007 | Ku et al. | 375/224 |
| 2009/0007201 | A1* | 1/2009 | Eerenberg et al. | 725/104 |
| 2009/0022051 | A1* | 1/2009 | Laulainen | 370/216 |
| 2009/0059962 | A1* | 3/2009 | Schmidt et al. | 370/503 |

FOREIGN PATENT DOCUMENTS

EP 1394975 A2 3/2004
JP 2008048140 A 2/2008

OTHER PUBLICATIONS

S. Zhu et al., "The Study and Analysis of Joint Adaptive Clock Recovery Mechanism for TDMoIP", Networking, Sensing and Control, 2008. ICNSC 2008. IEEE International Conference on, IEEE, Apr. 6, 2008, pp. 533-538.
Search Report and Search Opinion for EP 09166761, Nov. 3, 2009, NEC Corporation.

* cited by examiner

*Primary Examiner* — Ricky Ngo
*Assistant Examiner* — Christine Ng

(57) ABSTRACT

Disclosed is an apparatus comprising a jitter buffer that writes and reads packets transmitted via a packet network from a transmission node, a clock correction unit that obtains an inter-packet jitter, based on difference information between time stamp information at the time of reception of the packet on a receiving side and time stamp information attached to the packet at the time of transmission of the packet by a transmission node with regards to packets received before and after and obtains a transmission frequency and a PLL unit that receives frequency information from the clock correction unit and generates a clock of the frequency. A scheduler uses a frequency from the PLL unit as a transmission frequency to transmit a packet from the jitter buffer unit.

26 Claims, 9 Drawing Sheets

[CASE WHERE WRITE POINTER IS AT A POSITION 20 MS FROM POSITION OF READ POINTER]

[CASE WHERE WRITE POINTER IS AT A POSITION 8 MS FROM POSITION OF READ POINTER]

FIG. 4A  [POSITION OF WRITE POINTER IS APPROPRIATE.]
WRITE POINTER OF MAXIMUM DELAY PACKET
(MINIMUM ACCUMULATED NUMBER OF PACKETS) IS LESS THAN 1.
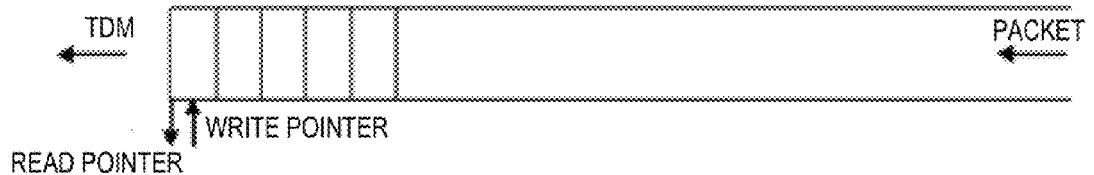
FIG. 4B
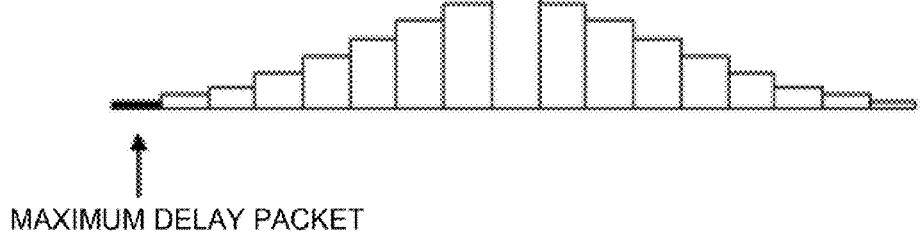
MAXIMUM DELAY PACKET
FIG. 4C  [POSITION OF WRITE POINTER IS NOT APPROPRIATE.]
WRITE POINTER OF MAXIMUM DELAY PACKET
(MINIMUM ACCUMULATED NUMBER OF PACKETS) IS 1 OR MORE.
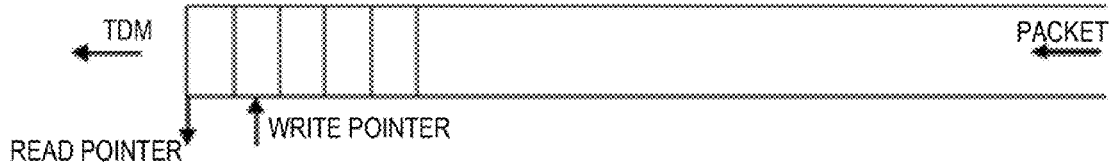
FIG. 4D
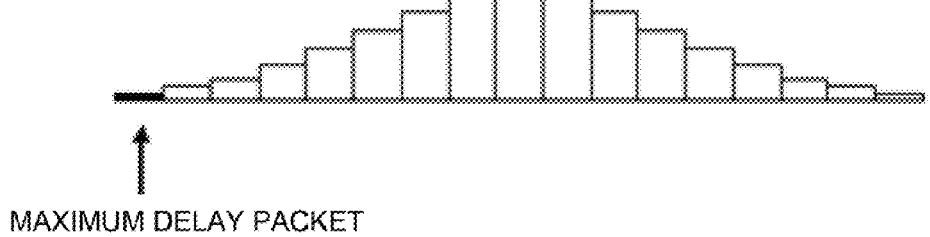
MAXIMUM DELAY PACKET FIG. 5A
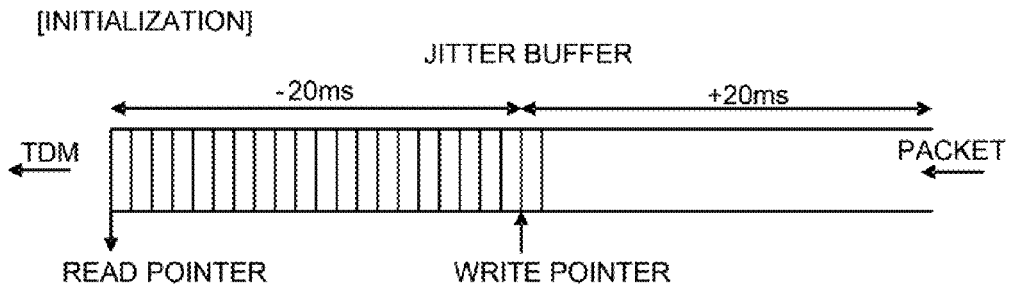
FIG. 5B
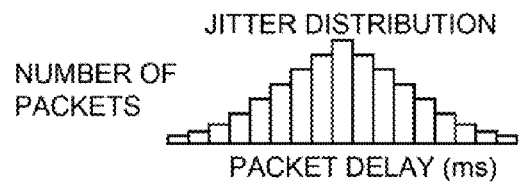
FIG. 5C
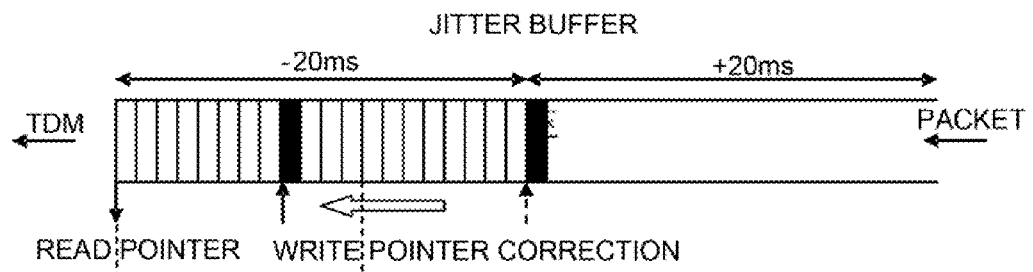
FIG. 5D
FIG. 5E
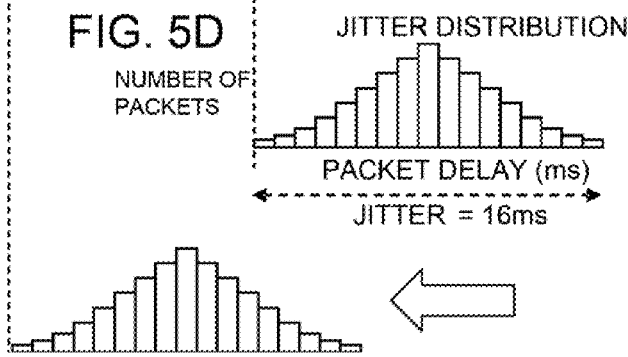

FIG. 6A [WHEN UNDERRUN OCCURS.]
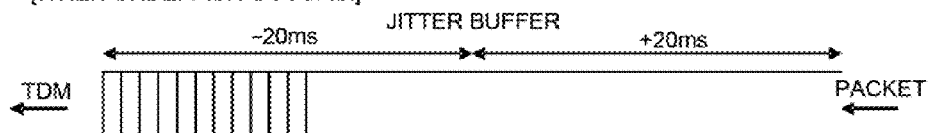
FIG. 6B
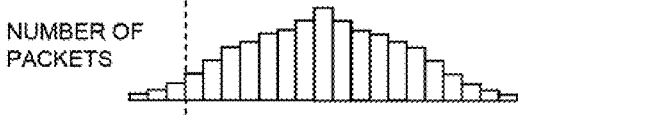
FIG. 6C
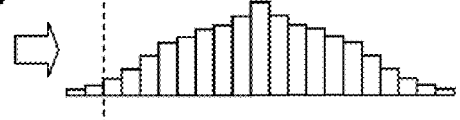
FIG. 6D
FIG. 6E
FIG. 6F (CASE WHERE JITTER HAS BECOME SMALL)
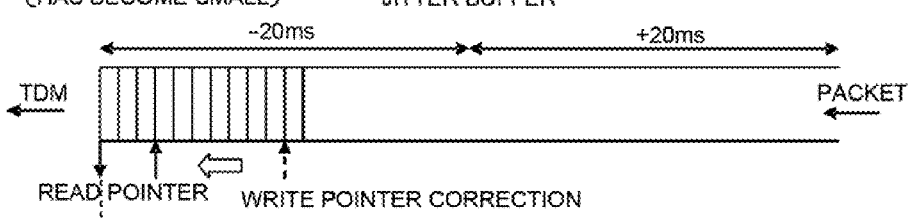
FIG. 6G
FIG. 6H
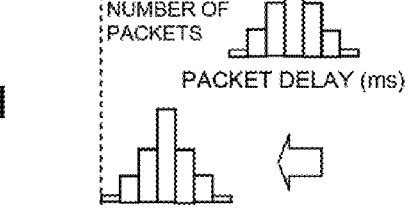

FIG. 7A [CASE WHERE READ SPEED IS CONSTANT]
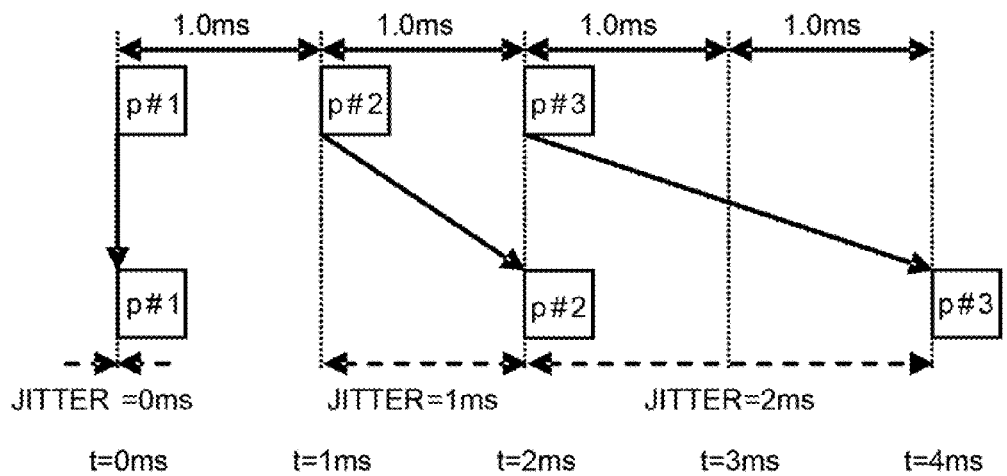
FIG. 7B
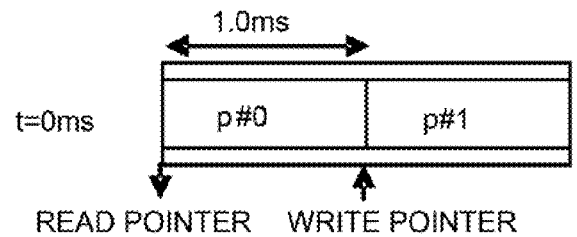
FIG. 7C
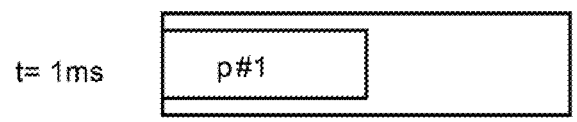
FIG. 7D
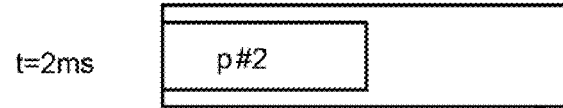
FIG. 7E
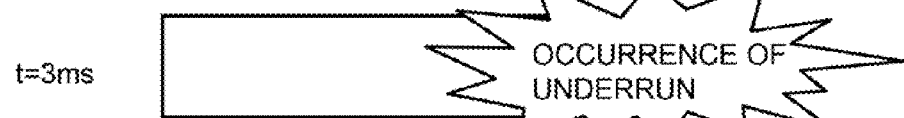
FIG. 7F
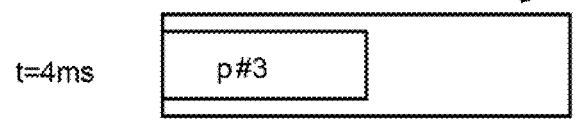

FIG. 8A [CASE WHERE READ SPEED VARIES]
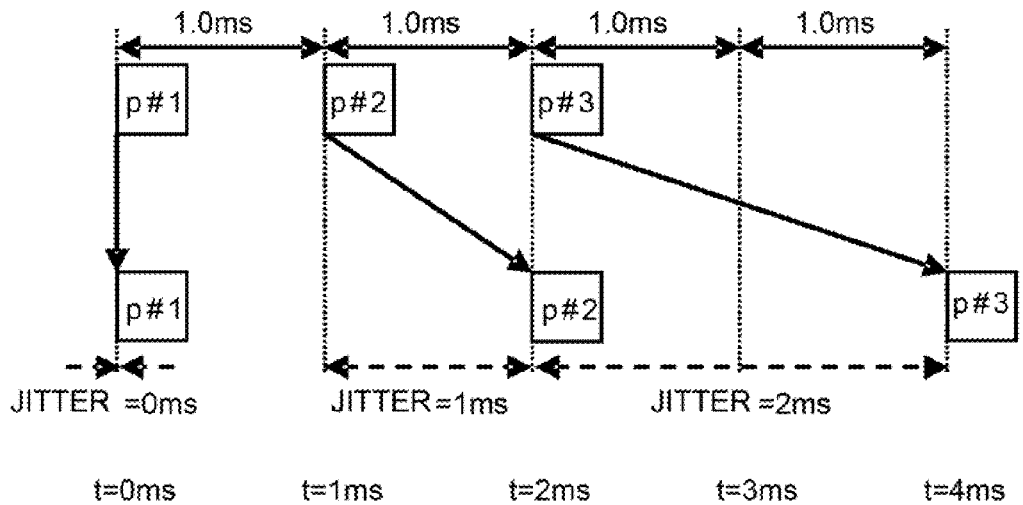
FIG. 8B
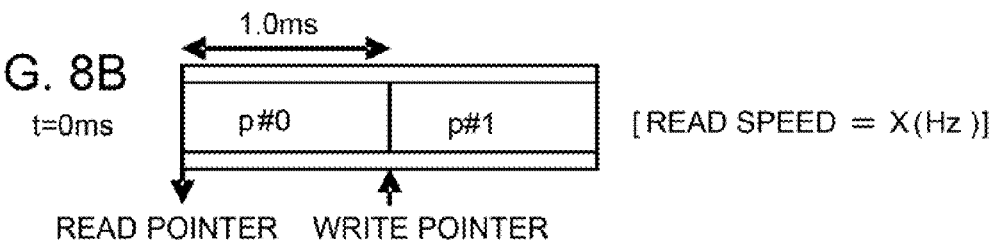
FIG. 8C
FIG. 8D
FIG. 8E
FIG. 8F

JITTER BUFFER CONTROL METHOD AND COMMUNICATION APPARATUS

REFERENCE TO RELATED APPLICATION

This application is based upon and claims the benefit of the priority of Japanese patent application No. 2008-196672, filed on Jul. 30, 2008, the disclosure of which is incorporated herein in its entirety by reference thereto.

TECHNICAL FIELD

The present invention relates to a communication apparatus, system, and method, and in particular, to control of a jitter buffer.

BACKGROUND

At present, in order to curtail Capex/Opex (Capital Expenditure/Operation Expenditure) to a minimum, mobile carriers are beginning to consider a transition from a conventional TDM (Time Division Multiplex) based network (2G) to next generation backhaul in a packet based network (3G) promoting backhaul efficiency and intensification. A key to reducing backhaul costs is collecting separate traffics for transmission in a single network. PWE3 (Pseudo Wire Emulation Edge to Edge), which virtually emulates a TDM circuit in a packet network, can achieve this object, and is attracting attention as a technology that can realize backhaul efficiency for mobile carriers.

According to PWE3, it is possible to consolidate existing TDM networks and IP networks, and it can be anticipated that networks will be made economic and flexible.

In Patent Document 1, there is disclosed a configuration that includes an extraction circuit that extracts a received packet number, a received sequence number, and main signal data, from a received packet signal; a jitter buffer in which he main signal data is written and then read out; and a jitter buffer control unit that measures change in reception time of a received packet by the received sequence number and a reference time, and that, at timing based on a computed average value obtaining by computing an average value of measured values thereof, controls the jitter buffer.
[Patent Document 1]
JP Patent Kokai Publication No. JP-P2008-48140A

SUMMARY

In PWE3, how to maintain quality of service of TDM communication built in an IP network constitutes technical issues. As one issue, a jitter buffer that absorbs jitter that occurs in an IP network may be cited. If the jitter buffer is made large, it is possible to absorb a large jitter, but to that extent, delay becomes large. With regard to mobile backhaul, in order to implement handover, it is necessary to curtail the delay as much as possible. In addition, for voice quality it is also desirable that delay be as small as possible.

Jitters that occur in respective networks are measured in advance, and a jitter buffer of a size that can absorb the jitters is statically set.

Accordingly, an object of the present invention is to provide a jitter buffer control method and apparatus that automatically measures an amount of a jitter occurring in a network, and control a buffer dynamically so that delay decreases.

The invention disclosed in the present application, in order to solve one or more of the abovementioned problems, is configured in outline as follows.

In the present invention, variations in jitter of a received packet is detected and a jitter buffer is controlled so that the delay in the jitter buffer decreases when the jitter increases.

According to the present invention, an apparatus (method, and program) are provided, in which: a communication apparatus, which receives via a packet network a packet transmitted by a transmitting side, comprises a jitter buffer that reads after writing a received packet, obtains inter-packet jitter, based on difference information between time stamp information at the time of packet reception and time stamp information attached to the packet at the time of packet transmission by the transmitting side, with regard to a plurality of received packets, changes a reference frequency according to the inter-packet jitter, and, based on changed transmission frequency, performs transmission of the packet from the jitter buffer.

In the present invention, the inter-packet jitter is obtained, based on the difference of the difference information related to two packets received temporarily before and after. In the present invention, a frequency obtained by multiplying, by the reference frequency, a value obtained by dividing a transmission interval of the packet by a value obtained by adding the inter-packet jitter to the transmission interval of the packet read out from the jitter buffer, may be taken as the transmission frequency.

In the apparatus of the present invention, a clock correction unit and a clock generation circuit that varies frequency are provided. The clock correction unit obtains, as the inter-packet jitter, a difference of difference information of the time stamp information at the time of reception of the packet on a receiving side and the time stamp information attached to the packet at the time of transmission of the packet by the transmitting side, and difference information of a packet received before the packet, and takes, as the transmission frequency, a frequency obtained by multiplying the reference frequency by a value obtained by dividing by a value obtained by adding the inter-packet jitter to the transmission interval. The clock generation circuit receives frequency information from the clock correction unit, and generates a clock of the frequency.

In the present invention, there is provided a scheduler that schedules transmission of a packet from a jitter buffer, and a packet branching unit that gives a received packet to the jitter buffer and also gives time stamp information and sequence number of the packet to a scheduler unit. In the jitter buffer, packets are accumulated in an input order thereof, and held for a time period defined by a read pointer and a write pointer; in the scheduler, a received time stamp and a sequence number are sequentially recorded, and a storage position within the jitter buffer of the subsequently transmitted packet is notified to the jitter buffer.

In the present invention, when the sequence number of the subsequent packet, with N as an address of the previous packet, is stored at an address M, the scheduler obtains a value M-N, corresponding to the subsequent packet position of the jitter buffer and transmits the obtained value to the jitter buffer. In the jitter buffer, a value M-N, corresponding to the subsequent packet position of the jitter buffer transmitted by the scheduler is received, and the packet is transmitted, using the frequency.

According to the present invention, in a jitter buffer that absorbs jitter occurring in a network, the buffer can be controlled dynamically so that delay can be decreased when jitter varies.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 4A and 4B are diagrams showing relationships of jitter buffer and jitter distribution in case a position of a write pointer is appropriate, and FIGS. 4C and 4D are diagrams showing relationships of jitter buffer and jitter distribution in case the position of the write pointer is not appropriate.

FIGS. 5A and 5B are diagrams showing relationships of jitter buffer and jitter distribution at start-up time, and FIGS. 5C, 5D, and 5E are diagrams showing relationships of jitter buffer and jitter distribution before and after write pointer correction, when write pointer correction is performed.

FIGS. 6A and 6B to 6E are diagrams showing relationships of jitter buffer when an underrun occurs and jitter distribution when a correction is made; and FIGS. 6F, 6G, and 6H are diagrams showing relationships of jitter buffer when the jitter has become small and jitter distribution before and after write pointer correction.

FIGS. 7A, and 7B to 7F are diagrams describing packet reading in a comparative example (cases of constant read speed).

FIGS. 8A, and 8B to 8F are diagrams describing packet reading in the present exemplary embodiment (cases of variable read speed).

PREFERRED MODES

Figure 1:
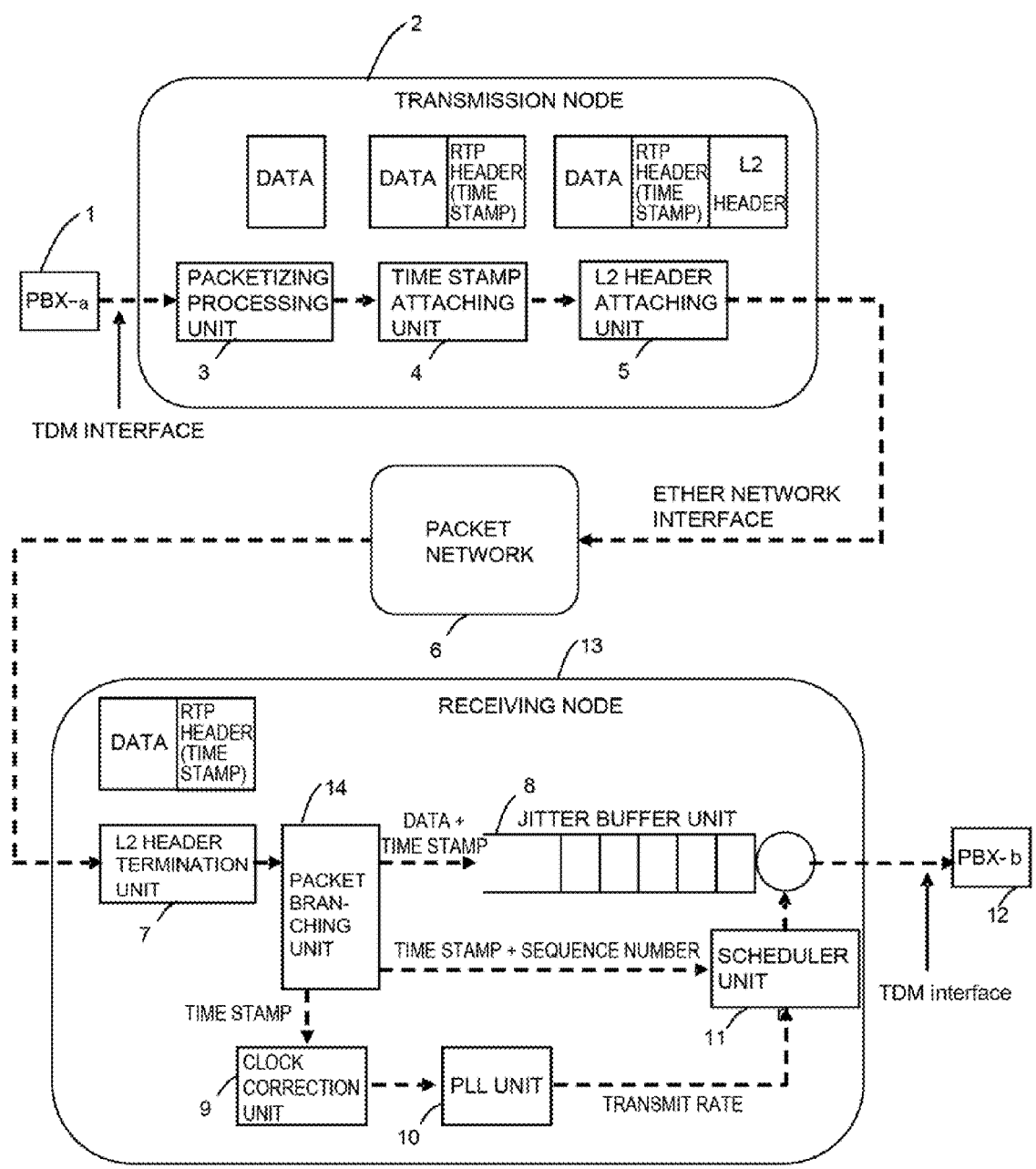
FIG. 1 is a diagram illustrating a configuration of one exemplary embodiment of the present invention.

In the present invention, on a receiving side using a time stamp which is given to a packet on a transmitting side, clock a displacement with regard to the transmitting and receiving sides is determined and correction of jitter is carried out. Read speed of a jitter buffer is variably controlled. A packet received on the receiving side is supplied to the jitter buffer by a packet branching unit, and a time stamp is supplied to a clock correction unit and a scheduler. The time stamp and a sequence number are both provided to the scheduler. In the jitter buffer, the packets are accumulated in the input order, are held for a time period defined by a read pointer and a write pointer, and a packet specified by the scheduler is output.

In one mode of the present invention, for a delay (a) due to a packet network, and a clock displacement (b) between transmitting and receiving sides, a basic delay time period is defined as A=a+b, an inter-packet jitter is defined by (c).

In one mode of the present invention, there is no particular limitation, at system start-up and the like, an initial value A0 for the basic delay time period may be defined. Alternatively, a test packet may be transmitted for a fixed time period, the clock correction unit, using a time stamp (Ts0) of a header of a received packet and a time stamp (Tr0) of a receiving side, may perform a calculation: Tr0−Ts0=a+b, and this may be taken as the initial value A0 of the basic delay time period.

In one mode of the present invention, in a communication apparatus, the clock correction unit, using a time stamp (Ts(k)) of die header of the received packet and a time stamp (Tr(k)) of the receiving side, perform a calculation: Tr(k)−Ts(k)=A(k) a plurality of times (k=0, 1, 2, . . . ) in a prescribed time period, and delivers c(k)=A(k)−A(k−1) to a clock generation unit (PLL unit) and a scheduler unit. The PLL unit, when a transmission frequency is F(t) for each packet, generates a frequency F(t+c) and the generated frequency to a transmission unit of the jitter buffer. In the scheduler unit, time stamps and sequence numbers, received from the packet branching unit, are stored in a sequential table and a storage position in the jitter buffer of a packet that will be transmitted next, is notified to the jitter buffer.

In one mode of the present invention, a predetermined time and the number of packets accumulated in the jitter buffer are monitored. When a minimum accumulation number of packets between a write pointer indicating a position of writing to the jitter buffer and a read pointer indicating a position of reading from the jitter buffer is one or more, it is decided that the position of the write pointer is not the position of the shortest delay, and so that the delay time is a minimum, a correction of the write pointer is performed in a direction that reduces the accumulation of packets. When the minimum number of accumulated packets is less than one, it is decided that the position of the write pointer is appropriate, and correction of the write pointer is not performed. When it is judged that correction processing of the write pointer is necessary, the minimum number of accumulated packets and the maximum number of accumulated packets in the prescribed time are measured, a measurement of jitter range is performed, and a correction is performed on the write pointer, so that the delay in the jitter buffer is set to the minimum.

In one mode of the present invention, after the write pointer was corrected, when the jitter due to the packet network has become large, the write pointer is corrected in a direction in which it is possible to absorb the jitter, in order to be able to absorb the jitter that has become large. In this regard, repeated write pointer correction is performed, in prescribed time units, until there is no longer an underrun, and control is performed to keep the delay small.

Since there may be packets, order of which may differ, the subsequent sequence number is confirmed. If there are a packet of the subsequent sequence number stored in an address M, with the address of the previous packet as N, a value M-N, corresponding to the subsequent packet position in the jitter buffer, is supplied to the transmission unit of the jitter buffer. In the jitter buffer, M-N, corresponding to the subsequent packet position in the jitter buffer, transmitted by the scheduler unit, is received, and packet transmission of the packet in question is performed using a frequency from the clock generation unit (PLL unit).

According to the present invention, the packet transmission frequency is dynamically varied, and jitter delay (jitter delay due to the packet network) of a packet is automatically corrected. Even in case jitter pattern has changed with the change of network or the like during operation, it is possible to control the buffer dynamically so that the delay decreases automatically. A description will be given below according to exemplary embodiments.

Exemplary Embodiment

FIG. 1 is a diagram showing a configuration of one exemplary embodiment of the present invention. In FIG. 1, there is shown a PWE3 (Pseudo Wire Emulation Edge to Edge) that virtually emulates a TDM (Time Division Multiplex) line. As shown in FIG. 1, PWE3 includes a PBX-a 1 (PBX: Private Branch exchange), a transmitting node 2, a packet network 6, a receiving node 13 (corresponding to a communication apparatus in the claims), and a PBX-b 12.

The transmitting node 2 includes a packetizing processing unit 3, a time stamp attaching unit 4, and an L2 header attaching unit 5.

The receiving node 13 includes an L2 header termination unit 7, a packet branching unit 14, a jitter buffer unit 8, a clock correction unit 9, a PLL (Phase Locked Loop) unit 10, and a scheduler unit 11.

The packetizing processing unit 3 receives TDM data transmitted from the PBX-a 1 and packetizes the TDM data every constant data size.

The time stamp attaching unit 4 attaches a time stamp to an RTP (Real Time Transport Protocol) header, in order to synchronize the transmitting node 2 and the receiving node 13.

At the receiving node 13, using the time stamp given at the transmitting node 2, a clock displacement with regard to the transmitting and receiving sides and the packet network 6 are determined and clock correction is carried out.

The L2 header attaching unit 5 adds an L2 header according to an Ether frame format, in order to enable the packet to transmit through the packet network 6.

The L2 header termination unit 7 terminates an Ether frame transmitted from the packet network 6 to remove the L2 header.

A received packet is supplied to the jitter buffer unit 8 by the packet branching unit 14, and at the same time a time stamp is read and supplied to the clock correction unit 9 and the scheduler unit 11. A sequence number also is supplied at the same time as the time stamp to the scheduler unit 11.

In the jitter buffer 8, the packets are accumulated in input order, a time-period (buffer accumulation time period) defined by the read pointer and the write pointer is maintained, and a packet specified by the scheduler unit 11 is searched and output. Here, jitter occurring due to, for example, a waiting time of a long packet, longer than prescribed data length, is absorbed by a router or a switch provided in the packet network 6.

The clock correction unit 9 determines a delay by the packet network 6, and a clock displacement between transmission and reception from values extracted from time stamp information and applies a correction to the PLL unit 10. Specifically, in the present exemplary embodiment, control is performed based on a basic delay time A.

When a delay due to the packet network 6 is expressed as "a", and the clock displacement between the transmitting and receiving nodes 2 and 13 is expressed by "b", the basic delay time A is defined as $$A=a+b.$$

Inter-packet jitter is defined by "c".

When a system is started up, an initial value for the basic delay time period A0 is defined in advance. Alternatively, test packets are transmitted for a fixed time period, and in the clock correction unit 9, with delay due to the packet network 6 as "a", and the displacement of the clock between transmission and reception as "b", using the time stamp (=Ts) of an RTP header of a received packet and a time stamp. (=Tr) on a receiving side, the following calculation is performed:

$$a0+b=Tr0-Ts0$$

The initial value of the delay time Tr0−Ts0 is taken as A0.

In a case of the delay time of the subsequent packet being A1, the delay time A1 is obtained as follows:

$$A1=a1+2b=Tr1-Ts1$$

The inter-packet jitter (=c1) at this time is obtained by calculating A1−A0. That is, $$c1=A1-A0$$

$$=(Tr1-Ts1)-(Tr0-Ts0)$$

In a similar procedure, the subsequent inter-packet jitter is obtained as $$c2=A2-A1$$

$$=(Tr2-Ts2)-(Tr1-Ts1)$$

Packet 1: A0=a0+b=Tr0−Ts0
Packet 2: A1=a1+2b=Tr1−Ts 1
Packet 3: A2=a2+3b=Tr2−Ts2

$$c1=A1-A0=(Tr1-Ts1)-(Tr0-Ts0)$$

$$c2=A2-A1=(Tr2-Ts2)-(Tr1-Ts1)$$

The PLL unit 10 outputs a clock according to control from the clock correction unit 9 so as to have synchronization with the transmitting node 2.

Supposing that the transmission frequency corresponding to each packet is a reference value F(t) [Hz], the PLL unit 10 generates a clock of a frequency of F(t+c) [Hz] and transmits the clock to the jitter buffer unit 8.

The scheduler unit 11 records a received time stamp and a sequence number sequentially in a table (not shown), and notifies a storing position of the subsequently transmitted packet in the jitter buffer unit 8 to the jitter buffer unit 8.

Since there may be some packets with erroneous orders, the subsequent sequence number is confirmed. For example, in case a sequence number of the subsequent packet is stored at an address M, with the address of the previous packet as N, the scheduler unit 11 calculates a value M-N, corresponding to the subsequent packet position in the jitter buffer unit 8 and transmits the value M-N to the transmission unit (not shown) of the jitter buffer unit 8.

The jitter buffer unit 8 receives the value M-N, which corresponds to the subsequent packet position in the jitter buffer unit 8 transmitted by the scheduler unit 11, and transmits the corresponding packet, using a frequency received from the PLL unit 10.

FIG. 2 is a diagram illustrating operation of the jitter buffer unit 8 in the present exemplary embodiment. FIG. 2A is a diagram showing an example of the jitter buffer in case the write pointer is at a position 20 ms from a position of the read pointer. FIG. 2B is a diagram showing an example of packet jitter distribution (distribution of packet delay (in units of ms)). FIG. 2C is a diagram showing an example of the jitter buffer in case the write pointer is at a position 8 ms from a position of the read pointer. FIG. 2D is a diagram showing an example of packet jitter distribution.

In case the jitter buffer is of length 40 ms with ±20 ms and one packet includes eight frames multiplexed, since one frame is 125 us, one packet is 1 ms.

Figure 2A:
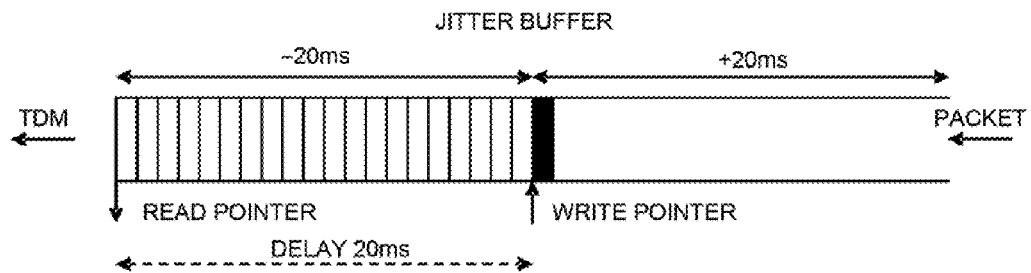
FIG. 2 is a diagram illustrating detailed operation of a jitter buffer of one exemplary embodiment of the present invention.
Figure 2B:
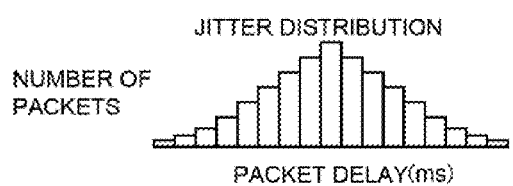

If the position of the write pointer is increased, a large jitter can be absorbed by the jitter buffer, but to that extent, the delay increases. For example, as shown in FIG. 2A, in case the write pointer is at a position 20 ms from the position of the read pointer, a jitter of 20 ms can be remedied, but since packets accumulated in the jitter buffer are output 20 ms later, a delay of 20 ms occurs due to the jitter buffer.

Even with the jitter same as above, it is possible to curtail the delay, when the position of the write pointer is at a position close to the read pointer.

Figure 2C:
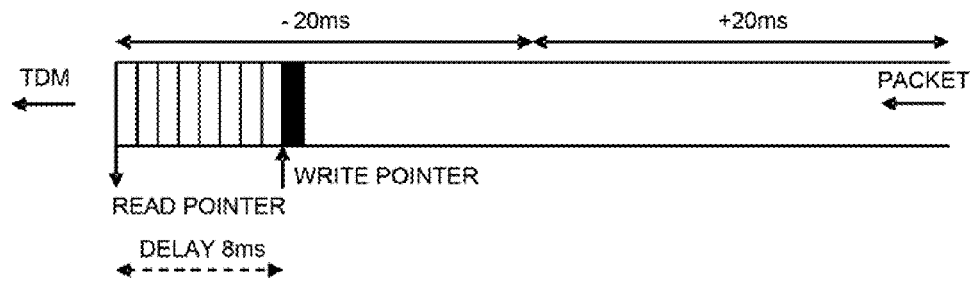
Figure 2D:
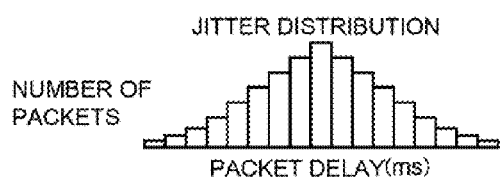

For example, as shown in FIG. 2C, in case the write pointer is at a position 8 ms from the position of the read pointer, since packets accumulated here are output 8 ms later, the delay of the jitter buffer is curtailed to 8 ms. However, absorption only up to a jitter of 8 ms at maximum is possible.

Figure 3:
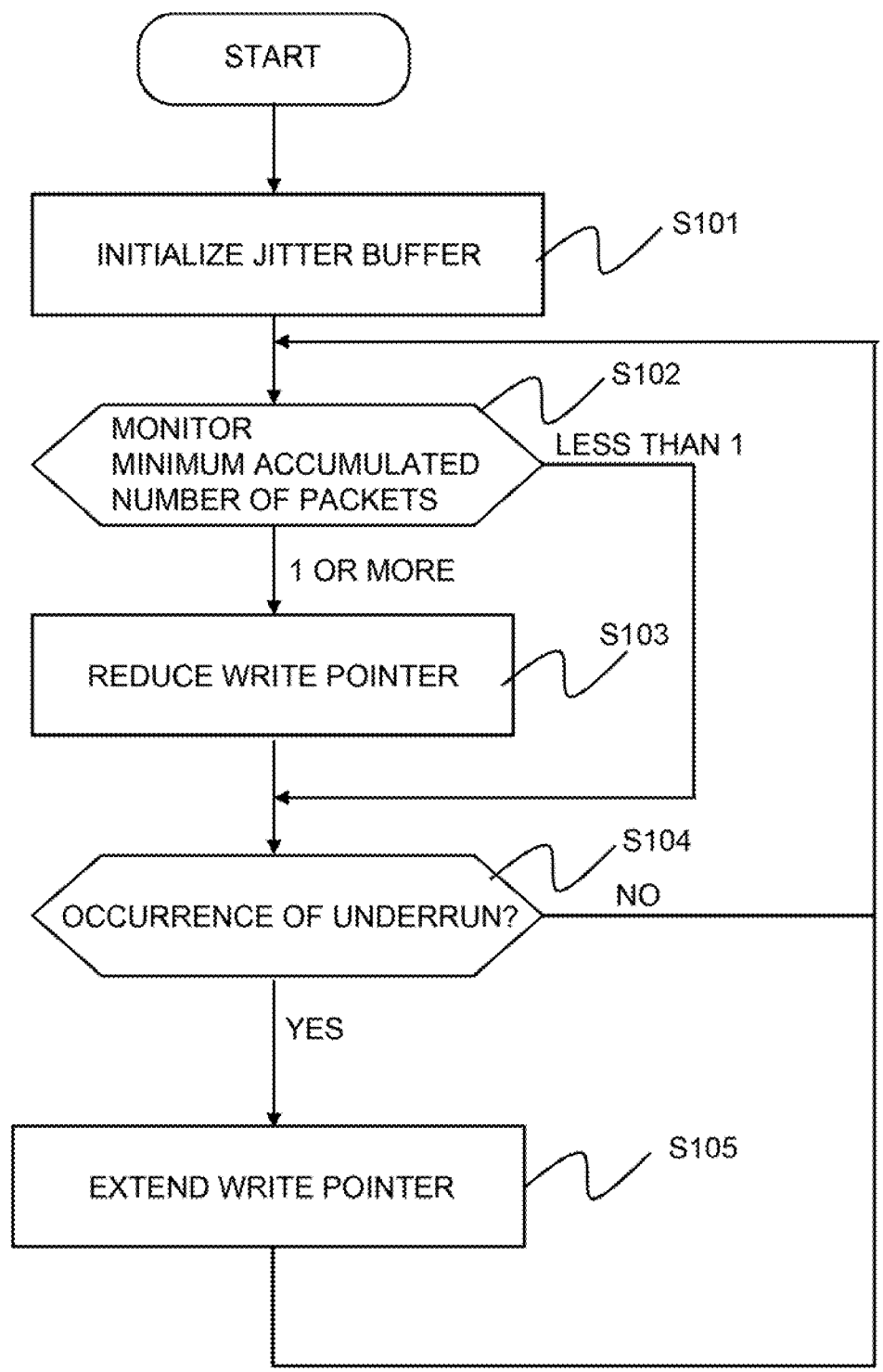
FIG. 3 is a flowchart describing operation of one exemplary embodiment of the present invention.

FIG. 3 shows a sequential flow chart when the write pointer of the jitter buffer is controlled dynamically. FIGS. 4A and 4B show jitter buffer and packet distributions, respectively, in case the position of the write pointer is appropriate. FIGS. 4C and 4D show jitter buffer and packet distributions, respectively, in case the position of the write pointer is not appropriate. FIGS. 5A and 5B show jitter buffer and packet distributions, respectively, at initialization. FIG. 5C shows the jitter buffer when a write pointer correction is performed. FIGS. 5D and 5E show jitter distributions before and after write pointer correction, respectively. FIG. 6A shows the jitter buffer when an underrun occurs. FIGS. 6B, 6C, 6D, and 6E show jitter distributions when a write pointer correction is made. FIG. 6F shows a jitter buffer where the jitter has become small. FIGS. 6G and FIG. 6H show relationships of jitter distribution before and after write pointer correction, respectively.

When a connection is established on PWE3, initialization of the jitter buffer is performed (step S101). The write pointer at the time of the initialization is disposed at the center of the jitter buffer unit 8. In the case of FIG. 5A, there is a buffer of 20 ms before and after the write pointer, and the read pointer is positioned at the head.

After that, in a certain fixed time period, the number of packets that have been accumulated in a queue (jitter buffer) is monitored (step S102). When the minimum number of accumulated packets is greater than equal to one, it is decided that the position of the write pointer is not appropriate (not at a position with the shortest delay), and the write pointer is corrected in a "reduce" direction (a direction in which the number of accumulated packets is decreased), so that the delay time becomes minimum (step S103, FIGS. 5C, 5D, and 5E). As shown in FIG. 4A, in case the minimum number of accumulated packets is less than one, it is decided that the position of the write pointer is appropriate, and correction is not carried out.

A condition at which the delay of the jitter buffer becomes a minimum is one in which a write pointer of a packet with the largest delay is at a position closest to the read pointer. Therefore, when the minimum number of accumulated packets is greater pr equal to one, it is decided that the write pointer of the packet with the largest delay is not close to the read pointer, and correction is applied.

When it is decided that correction processing of the write pointer is necessary, the minimum number of accumulated packets and the maximum number of accumulated packets in a certain fixed time are measured, and measurement of the jitter range is performed.

More specifically, in case the jitter buffer is of length 40 ms with ±20 ms and one packet includes eight frames multiplexed, since one frame is 125 us, one packet is 1 ms.

When the measurement result is that the minimum number of accumulated packets is 12 and the maximum number of accumulated packets is 29, by subtracting the length (1 ms) of the tail packet itself from

29−12=17 it is determined that the jitter range is 16 ms (refer to FIG. 5D).

Regarding the distribution of the pointers in the jitter buffer, a correction of 12 ms is carried out with respect to the write pointer, so as to have a minimum delay. Here, the write pointer shown in FIG. 5C shows an example of a delay value with the largest number of packets in the jitter distribution.

In contrast to the delay before the correction of the write pointer being 20 ms, the delay after correction of the write pointer is 8 ms (the write pointer after correction is positioned 8 ms after the position of the read pointer).

After correcting the write pointer, when a jitter becomes large due to variations of the network, underrun occurs (step S104 in FIG. 3). So as to be able to absorb the jitter that has become large, the write pointer is corrected in an "extend" direction (a direction in which it is possible to absorb the jitter that is protruding) (refer to step S105, FIG. 6A).

If the correction value is too large with regard to the correction value of the write pointer at this time, the delay in the jitter buffer becomes large. Therefore, by carrying out correction of the write pointer in small steps (for example, in 1 ms step), and performing correction repeatedly until the underrun is no longer present, it is possible to make the delay small (FIGS. 6B to 6E).

When the jitter becomes small, due to variation of the network (refer to FIG. 6F), for a prescribed time period, queue length of the jitter buffer is monitored. If the minimum number of accumulated packets is greater than or equal to one (FIGS. 4C and 4D), it is decided that the position of the write pointer is not appropriate (not at a position of shortest delay), and a correction is executed in a "reduce" direction (a direction in which the distribution of pointers in the jitter buffer has the smallest delay) (FIGS. 6F, 6G, and 6H).

In this way, by monitoring the jitter buffer and executing "reduce" and "extend"processing of the write pointer, it is possible to constantly keep the delay at a minimum.

Next, with reference to FIG. 8, a description is given concerning a method of determining a transmission frequency corresponding to each packet in the present exemplary embodiment.

As an example, a case is cited where, with a packet transmission interval of 1.0 ms, the write pointer in the jitter buffer is at a location 1 ms from the read pointer, and jitter of 1.0 ms and 2.0 ms has occurred in the packet network.

As shown in a comparative example in FIG. 7, in case read speed is constant, it has been necessary to prepare a buffer having a capacity to be able to absorb the jitter, in order to absorb jitter occurring in the packet network.

In contrast to this, as shown in FIG. 8, according to the present exemplary embodiment, by dynamically varying read speed, it is possible to keep the buffer capacity small.

In a case where the read speed of FIG. 7 is constant:
(1) at t=0 ms, p#1 arrives (writing is performed after p#0 in the jitter buffer) (refer to FIG. 7B),
(2) at t=1 ms, for p#0, all of the jitter buffer is output (p#1 is the head of the jitter buffer) (FIG. 7C),
(3) at=2 ms, p#2 (jitter=1 ms) arrives and is written at the head of the jitter buffer (FIG. 7D),
(4) at=3 ms, p#3 does not arrive (jitter=2 ms), and since there is no read data, an underrun occurs (FIG. 7E); at t=3 ms, P#2 is read from the jitter buffer, and the jitter buffer becomes empty.
(5) at t=4 ms, p#3 arrives and is written to the head of the jitter buffer (FIG. 7F).

On the other hand, according to the present exemplary embodiment, in case the read speed is variable, as shown in FIG. 8, when t=2 ms, the inter-packet jitter (c) is obtained from the time stamp (Ts) on the transmitting side and the time stamp (Tr) on the receiving side, and the transmission frequency F is obtained from the following formula.

$$F(t+c)=F(t)\times\{\text{transmission interval}/(\text{transmission interval}+\text{inter-packet jitter})\}$$

In this way, by dynamically changing the speed of reading data (the read speed of the jitter buffer), it is possible to prevent the occurrence of an underrun in the jitter buffer.

(1) At t=0 ms, p#1 arrives (writing is performed after p#0 in the jitter buffer) (refer to FIG. 8B).

(2) At t=1 ms, p#0 is output from the jitter buffer, and p#1 is the head of the jitter buffer (FIG. 8C).

(3) At t=2 ms, packet p#2 (jitter=1 ms) arrives and is written at the head of the jitter buffer (FIG. 8D).

(4) Jitter between packets p#3 and p#2 is obtained, the read speed of the jitter buffer is varied, and at t=3 ms, a part of p#2 is not read from the jitter buffer, but is left in the jitter buffer (FIG. 8E).

(5) At t=4 ms, p#2 is completely read, and p#3 is written at the head of the jitter buffer (FIG. 8F).

Conventionally, jitters occurring in various networks are measured in advance, and plural fixed length buffer sizes matching jitter amount are prepared. In contrast to this, according to the present exemplary embodiment, without measuring jitters occurring in various networks in advance, it is possible to measure the size of the jitter occurring in the network automatically, and to control the buffer dynamically so that delay becomes small.

Even when a jitter pattern changes with a change of the network during operation and the like, the present invention has a flexibility in which it is possible to control the buffer dynamically so that the delay decreases automatically.

Conventionally, as described above, the read speed is constant and it is necessary to prepare a buffer with a capacity greater than or equal to jitter range that is desired to be absorbed in order to absorb jitter occurring in the packet networks. In contrast to this, in the present exemplary embodiment, by dynamically generating the packet transmission frequency which can correct the jitter delay of the packet in the packet network, it is possible to keep the buffer capacity small.

Figure 9A:
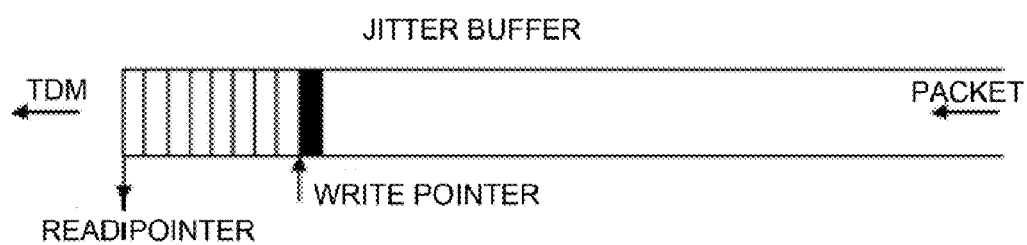
FIGS. 9A-9C are diagrams illustrating another exemplary embodiment of the present invention.
Figure 9B:
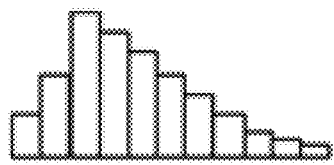
Figure 9C:
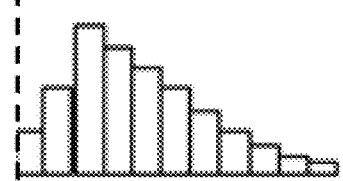

FIGS. 9A-9C are diagrams for describing another exemplary embodiment of the present invention. In an asymmetric pattern in which jitter distribution is not a normal distribution, even if a jitter buffer close to a jitter range thereof is provided, a large delay results.

By using an algorithm of the present exemplary embodiment, it is possible to minimize the delay for any jitter pattern, irrespective of asymmetry. In the present exemplary embodiment, with regard to processing of the clock correction unit 9 and so forth in FIG. 1, a function therefor may be realized by a program executed on a computer that is included by a reception node. According to the present invention, there is provided a computer readable recording medium that stores the program.

In the abovementioned Patent Document 1, by analyzing a jitter characteristic of a network or a transmission path, determination of an optimal jitter buffer operation point is made possible, but it is necessary to manually set the jitter buffer capacity (JB). In contrast to this, according to the present exemplary embodiment, it is possible to dynamically control the jitter buffer and, when an operation state is entered, as long as packet loss or the like does not occur, changing of operation point is not performed. In the abovementioned Patent Document 1, an average value is taken for calculation of the jitter correction, which is different from the present exemplary embodiment.

The disclosures of the aforementioned Patent Documents 1 are incorporated by reference herein. The particular exemplary embodiments or examples may be modified or adjusted within the gamut of the entire disclosure of the present invention, inclusive of claims, based on the fundamental technical concept of the invention. Further, variegated combinations or selections of the elements disclosed herein may be made within the framework of the claims. That is, the present invention may encompass various modifications or corrections that may occur to those skilled in the art within the gamut of the entire disclosure of the present invention, inclusive of claim and the technical concept of the present invention.

What is claimed is:

1. A communication apparatus that receives, via a packet network, a packet transmitted by a transmission side, the apparatus comprising:
a jitter buffer in which after the packet received is written, the packet being is read; and
a control unit that obtains an inter-packet jitter based on difference information between time stamp information at the time of reception of the packet and another time stamp information attached to the packet at the time of transmission of the packet by the transmission side, with regard to at least one of a plurality of the received packets, and that performs control to change a reference frequency in accordance with the inter-packet jitter to transmit the packet from the jitter buffer based on a changed transmission frequency, wherein the control unit takes, as the transmission frequency, a frequency obtained by multiplying, by the reference frequency, a value obtained by dividing a transmission interval of packets read from the jitter buffer, by a value obtained by adding the inter-packet jitter to the transmission interval of the packets.

2. The communication apparatus according to claim 1, wherein the control unit obtains the inter-packet jitter, based on the difference of the difference information related to two packets received temporarily before and after.

3. The communication apparatus according to claim 1, wherein the packet is transmitted via a TDM (Time Division Multiplex) interface to a PBX (Private Branch eXchange).

4. A system comprising:
the communication apparatus according to claim 1; and
a communication apparatus that attaches a time stamp to a header of a packet to be transmitted to the packet network.

5. A communication apparatus that receives, via a packet network, a packet transmitted by a transmission side, the apparatus comprising:
a jitter buffer in which after the packet received is written, the packet being is read; and
a control unit that obtains an inter-packet jitter based on difference information between time stamp information at the time of reception of the packet and another time stamp information attached to the packet at the time of transmission of the packet by the transmission side, with regard to at least one of a plurality of the received packets, and that performs control to change a reference frequency in accordance with the inter-packet jitter to transmit the packet from the jitter buffer based on a changed transmission frequency, wherein the control unit comprises:
a clock correction unit; and
a clock generation circuit that changes a clock frequency, wherein the clock correction unit obtains the inter-packet jitter, based on a difference of:

difference information, with regard to one packet received, between time stamp information at the time of reception of the one packet and time stamp information attached to the one packet at the time of transmission of the one packet by the transmitting side; and difference information, with regard to a packet received before the one packet, between time stamp information at the time of reception of the packet and time stamp information attached to the packet at the time of transmission of the packet by the transmitting side, the clock correction unit takes as the transmission frequency, a frequency obtained by multiplying, by the reference frequency, a value obtained by dividing the transmission interval of the packets by a value obtained by adding the inter-packet jitter to the transmission interval of packets read from the jitter buffer, the clock generation circuit receives transmission frequency information from the clock correction unit, generates a clock of the frequency, and the packet is transmitted from the jitter buffer using frequency from the clock generation circuit.

6. The communication apparatus according to claim 5, wherein the control unit obtains the inter-packet jitter, based on the difference of the difference information related to two packets received temporarily before and after.

7. The communication apparatus according to claim 5, wherein the packet is transmitted via a TDM (Time Division Multiplex) interface to a PBX (Private Branch eXchange).

8. A system comprising:
the communication apparatus according to claim 5; and
a communication apparatus that attaches a time stamp to a header of a packet to be transmitted to the packet network.

9. A communication apparatus that receives, via a packet network, a packet transmitted by a transmission side, the apparatus comprising:
a jitter buffer in which after the packet received is written, the packet being is read: and
a control unit that obtains an inter-packet jitter based on difference information between time stamp information at the time of reception of the packet and another time stamp information attached to the packet at the time of transmission of the packet by the transmission side, with regard to at least one of a plurality of the received packets, and that performs control to change a reference frequency in accordance with the inter-packet jitter to transmit the packet from the jitter buffer based on a changed transmission frequency, wherein the number of packets accumulated in the jitter buffer are monitored for a prescribed time,
in case the minimum number of accumulated packets between a write pointer indicating a position of writing to the jitter buffer and a read pointer indicating a position of reading from the jitter buffer is greater than or equal to one, it is decided that the position of the write pointer is not a position of the shortest delay, and a correction of the write pointer is performed in a direction that reduces the accumulation of packets so that delay time is a minimum, and
in case the minimum number of accumulated packets is less than one, it is decided that the position of the write pointer is appropriate, and correction of the write pointer is not performed, and wherein
when it is decided that correction processing of the write pointer is necessary, the minimum number of accumulated packets and the maximum number of accumulated packets in a prescribed time are measured, a measurement of jitter range is performed, and a correction is performed on the write pointer, so that delay in the jitter buffer is a minimum.

10. The communication apparatus according to claim 9, wherein in case, after correction of the write pointer, jitter due to the packet network has become large, control is performed to correct the write pointer in a direction in which it is possible to absorb the jitter, in order to absorb the jitter that has become large, wherein control is performed to keep the delay small by repeating write pointer correction, in prescribed time units, until there is no longer an underrun.

11. The communication apparatus according to claim 9, wherein the control unit obtains the inter-packet jitter, based on the difference of the difference information related to two packets received temporarily before and after.

12. The communication apparatus according to claim 9, wherein the packet is transmitted via a TDM (Time Division Multiplex) interface to a PBX (Private Branch eXchange).

13. A system comprising:
the communication apparatus according to claim 9; and
a communication apparatus that attaches a time stamp to a header of a packet to be transmitted to the packet network.

14. A communication apparatus that receives, via a packet network, a packet transmitted by a transmission side, the apparatus comprising:
a jitter buffer in which after the packet received is written, the packet being is read; and
a control unit that obtains an inter-packet jitter based on difference information between time stamp information at the time of reception of the packet and another time stamp information attached to the packet at the time of transmission of the packet by the transmission side, with regard to at least one of a plurality of the received packets, and that performs control to change a reference frequency in accordance with the inter-packet jitter to transmit the packet from the jitter buffer based on a chanqed transmission frequency, further comprising:
a scheduler unit that schedules transmission of a packet from the jitter buffer; and
a packet branching unit that gives a packet received from the packet network to the jitter buffer and gives time stamp information and sequence number of the packet to the scheduler unit, wherein
in the jitter buffer, packets are accumulated in input order from the packet branching unit, and held for a time period specified by a read pointer and a write pointer, and
the scheduler unit records time stamp information and a sequence number in sequence, and notifies a storage position within the jitter buffer of the subsequently transmitted packet to the jitter buffer.

15. The communication apparatus according to claim 14, wherein the scheduler unit, in case a sequence number of a subsequent packet, with N as an address of the previous packet, is stored in an address M, obtains a value M-N, corresponding to the subsequent packet position of a jitter buffer, and transmits the value M-N to the jitter buffer, and
the jitter buffer receives a value M-N, corresponding to the subsequent packet position of the jitter buffer transmitted by the scheduler unit, and transmits the packet using the frequency.

16. The communication apparatus according to claim 14, wherein the control unit obtains the inter-packet jitter, based on the difference of the difference information related to two packets received temporarily before and after.

17. The communication apparatus according to claim 14, wherein the packet is transmitted via a TDM (Time Division Multiplex) interface to a PBX (Private Branch eXchange).

18. A system comprising:
the communication apparatus according to claim 14; and
a communication apparatus that attaches a time stamp to a header of a packet to be transmitted to the packet network.

19. A method of controlling a jitter buffer in which a packet received via a packet network from a transmission side is written and read, the method comprising:
detecting a change of jitter of a received packet:
controlling the jitter buffer so that, with regard to increase of the jitter, delay in the jitter buffer decreases;
receiving, via the packet network, a packet transmitted by the transmission side and writing the received packet temporarily into a jitter buffer;
obtaining a inter-packet litter, with regard to each of a plurality of received packets, based on difference information of time stamp information at the time of reception of the packet, and time stamp information attached to the packet at the time of transmission of the packet by the transmitting side;
performing control to change a reference frequency according to the inter-packet jitter; and
performing transmission of the packets from the jitter buffer, based on changed transmission frequency, wherein a frequency obtained by multiplying, by the reference frequency, a value obtained by dividing a transmission interval of packets read from the jitter buffer, by a value obtained by adding the inter-packet jitter to the transmission interval of the packets, is taken as the transmission frequency.

20. The method according to claim 19, comprising obtaining the inter-packet jitter, based on a difference of the difference information related to two packets received temporarily before and after.

21. A method of controlling a jitter buffer in which a packet received via a packet network from a transmission side is written and read, the method comprising:
detecting a change of jitter of a received packet;
controlling the jitter buffer so that, with regard to increase of the jitter, delay in the jitter buffer decreases;
receiving, via the packet network, a packet transmitted by the transmission side and writing the received packet temporarily into a jitter buffer;
obtaining a inter-packet jitter, with regard to each of a plurality of received packets, based on difference information of time stamp information at the time of reception of the packet, and time stamp information attached to the packet at the time of transmission of the packet by the transmitting side;
performing control to change a reference frequency according to the inter-packet jitter; and
performing transmission of the packets from the litter buffer, based on changed transmission frequency, the method further comprising:
providing time stamp information and sequence number of the packets to a scheduler that schedules transmission of a packet from a jitter buffer;
the jitter buffer accumulating packets are accumulated in input order, and holding for a time period defined by a read pointer and a write pointer; and
the scheduler recording a received time stamp and a sequence number in sequence, and notifying a storage position in the jitter buffer of the subsequently transmitted packet to the jitter buffer.

22. The method according to claim 21, comprising:
monitoring the number of packets accumulated in the jitter buffer, for a prescribed time period;
deciding that the position of the write pointer is not a position of the shortest delay, and performing a correction of the write pointer in a direction that reduces the accumulation of packets so that delay time is a minimum, in case the minimum number of accumulated packets between a write pointer indicating a position of writing to the jitter buffer and a read pointer indicating a position of reading from the jitter buffer is greater than or equal to one; and
deciding that the position of the write pointer is appropriate, and performing no correction of the write pointer, in case the minimum number of accumulated packets is less than one, and wherein
when it is decided that correction processing of the write pointer is necessary, the minimum number of accumulated packets and the maximum number of accumulated packets in a prescribed time are measured, a measurement of jitter range is performed, and a correction is performed on the write pointer, so that delay in the jitter buffer is a minimum.

23. The method according to claim 21, comprising,
in case, after correction of the write pointer, jitter due to the packet network has become large,
performing control to correct the write pointer in a direction in which it is possible to absorb the jitter, in order to absorb the jitter that has become large, wherein control is performed to keep the delay small by repeating write pointer correction, in prescribed time units, until there is no longer an underrun.

24. The method according to claim 21, comprising
the scheduler, in case a sequence number of a subsequent packet, with N as an address of the previous packet, is stored in an address M, obtaining a value M-N, corresponding to the subsequent packet position of a jitter buffer, and transmitting the value M-N to the jitter buffer, and
the jitter buffer receiving a value M-N, corresponding to the subsequent packet position of the jitter buffer transmitted by the scheduler, and transmitting the packet using the frequency.

25. The method according to claim 21, comprising obtaining the inter-packet jitter, based on a difference of the difference information related to two packets received temporarily before and after.

26. A non-transitory computer readable recording medium storing a program that causes a computer comprising a communication apparatus that receives, via a packet network, a packet transmitted from a transmitting side, to execute the processing comprising:
obtaining an inter-packet litter based on difference information between time stamp information at the time of reception of the packet and another time stamp information attached to the packet at the time of transmission of the packet by the transmission side, with regard to each of a plurality of received packets; and
performing control to change a reference frequency in accordance with the inter-packet jitter to transmit the packet from a litter buffer based on a changed transmission frequency, storing the program causing the computer to execute the processing of:
taking, as the transmission frequency, a frequency obtained by multiplying, by the reference frequency, a value obtained by dividing a transmission interval of packets read from the jitter buffer by a value obtained by adding the inter-packet jitter to the transmission interval of the packets.

* * * * *